United States Patent
Hirao et al.

(10) Patent No.: US 6,843,569 B2
(45) Date of Patent: Jan. 18, 2005

(54) PROJECTION TYPE DISPLAY DEVICE

(75) Inventors: Yoshichika Hirao, Neyagawa (JP); Naoki Kaise, Higashiosaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/293,618

(22) Filed: Nov. 14, 2002

(65) Prior Publication Data

US 2003/0095239 A1 May 22, 2003

(30) Foreign Application Priority Data

Nov. 16, 2001 (JP) ........................................ 2001-351853

(51) Int. Cl.⁷ ............................................. G03B 21/00
(52) U.S. Cl. ..................................................... 353/70
(58) Field of Search ................... 353/69, 70; 348/745, 348/806

(56) References Cited

U.S. PATENT DOCUMENTS

| | | | | |
|---|---|---|---|---|
| 3,639,034 A | * | 2/1972 | La Russa | 353/26 R |
| 4,422,153 A | * | 12/1983 | Arai et al. | 382/293 |
| 5,548,357 A | * | 8/1996 | Appel et al. | 353/69 |
| 6,367,933 B1 | * | 4/2002 | Chen et al. | 353/69 |
| 6,416,186 B1 | * | 7/2002 | Nakamura | 353/69 |
| 6,450,647 B1 | * | 9/2002 | Takeuchi | 353/69 |
| 6,491,400 B1 | * | 12/2002 | Chen et al. | 353/70 |
| 6,511,185 B1 | * | 1/2003 | Gananathan | 353/69 |
| 6,527,395 B1 | * | 3/2003 | Raskar et al. | 353/70 |

* cited by examiner

Primary Examiner—William C. Dowling
(74) Attorney, Agent, or Firm—Westerman, Hattori, Daniels & Adrian, LLP

(57) ABSTRACT

In a projection type display device having an electrical trapezoidal distortion correcting function, there are provided detection means for detecting an angle of inclination in the vertical direction of an optical axis of the projection type display device toward a screen surface, and control means for controlling the display position of an on screen display image displayed in a screen on the basis of the angle of inclination detected by the detection means.

2 Claims, 5 Drawing Sheets

FIG. 1 PRIOR ART
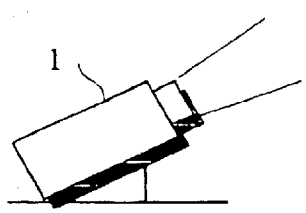
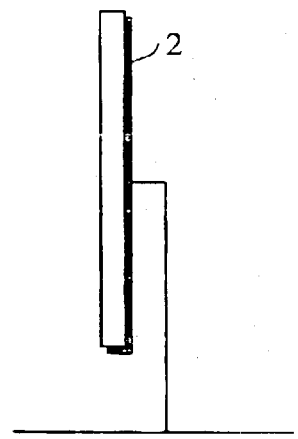
FIG. 2a PRIOR ART      FIG. 2b PRIOR ART
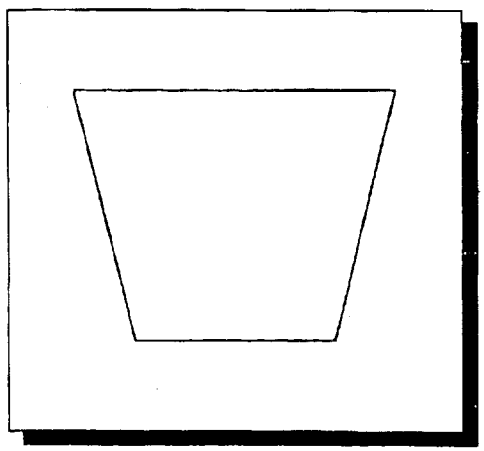
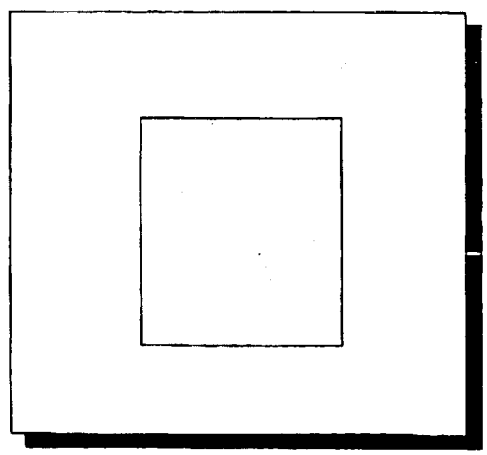

FIG. 3 PRIOR ART
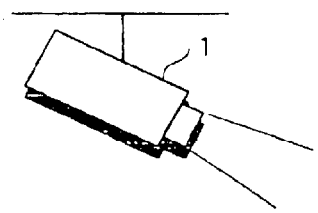
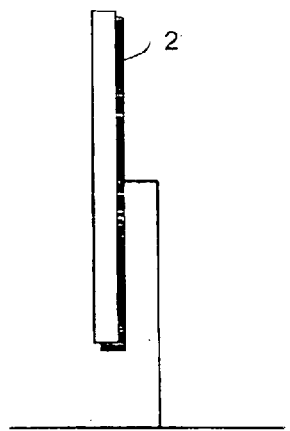
FIG. 4a PRIOR ART
FIG. 4b PRIOR ART
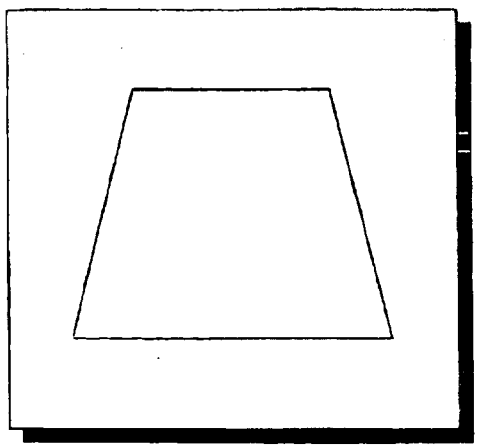
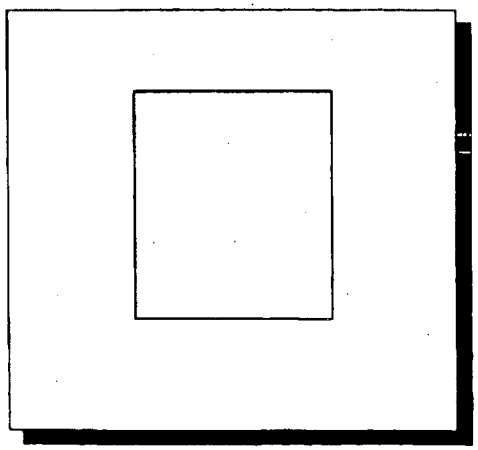

PROJECTION TYPE DISPLAY DEVICE

BACKGROUND OF THE INVENTION

1. Field of the Invention

The present invention relates to a projection type display device comprising a not optical but electrical trapezoidal distortion correcting function.

2. Description of the Prior Art

FIG. 1 illustrates an example of the installation of a liquid crystal projector 1 in a case where the liquid crystal projector 1 is arranged with the top thereof directed upward toward a screen 2.

When the liquid crystal projector 1 is arranged with the top thereof directed upward toward the screen 2, a lower part of a video projected onto the screen 2 shrinks, as shown in FIG. 2a, thereby causing trapezoidal distortion.

When an upper part of the video is shrunken by signal processing (electrical trapezoidal distortion correction processing) with respect to such trapezoidal distortion that the lower part of the video shrinks, the contour of the video projected onto the screen 2 becomes square, as shown in FIG. 2b, thereby correcting the trapezoidal distortion.

FIG. 3 illustrates an example of the installation of the liquid crystal projector 1 in a case where the liquid crystal projector 1 is arranged with the top thereof directed downward toward the screen 2.

When the liquid crystal projector 1 is arranged with the top thereof directed downward toward the screen 2, an upper part of a video projected onto the screen 2 shrinks, as shown in FIG. 4a, thereby causing trapezoidal distortion.

When a lower part of the video is shrunken by signal processing with respect to such trapezoidal distortion that the upper part of the video shrinks, the contour of the video projected onto the screen 2 becomes square, as shown in FIG. 4b, thereby correcting the trapezoidal distortion.

When the trapezoidal distortion is corrected by the signal processing, however, an image must be compressed by being subjected to nonlinear filtering in both the horizontal and vertical directions, as already known. When the image is compressed in a case where the trapezoidal distortion is corrected, the amount of information related to the image decreases, resulting in deterioration of the image quality and omission of the amount of information.

Meanwhile, the video projected onto the screen 2 may include an OSD (On Screen Display) image. In many cases, used as the OSD image is one having important information related to a liquid crystal projector such as image control or function switching displayed thereon using a combination of characters, drawings and icons (pictures). Further, the OSD image is fine because its font or the like is fine in order to transmit more information in its character.

FIG. 5a illustrates a video projected onto the screen in a case where the liquid crystal projector 1 is arranged, as shown in FIG. 1, and an OSD image A is included in an upper part of the video. FIG. 5b illustrates a video projected onto the screen in a case where the video as shown in FIG. 5a is subjected to trapezoidal distortion correction.

Such trapezoidal distortion that a lower part of the video shrinks, as shown in FIG. 5a, is corrected by compressing an upper part of the video, similarly to the lower part thereof, as shown in FIG. 5b. However, a compression rate increases toward an upper part of the screen, and the degree of decrease or omission of the amount of information on the screen increases in proportion thereto. When the OSD image A is included in the upper part of a trapezoidal video whose lower part shrinks, as shown in FIG. 5a, therefore, the OSD image is difficult to see in the video which has been subjected to trapezoidal distortion correction, as shown in FIG. 5b.

That is, a video signal other than the OSD image is similarly compressed and corrected. In the video signal, however, its field or frame constitutes one image. Even if a part of an upper part or a lower part of the video signal is compressed so that the amount of information decreases, therefore, it is possible to understand the contents of the image. Contrary to this, the OSD image does not perform its inherent function when the amount of information related to its part decreases so that characters are difficult to read, for example.

SUMMARY OF THE INVENTION

An object of the present invention is to provide, in a projection type display device comprising an electrical trapezoidal distortion correcting function, a projection type display device capable of keeping the decrease in the amount of information related to an OSD image caused by trapezoidal distortion correction low and capable of making the OSD image easy to see.

In a projection type display device having an electrical trapezoidal distortion correcting function, a first projection type display device according to the present invention is characterized by comprising detection means for detecting an angle of inclination in the vertical direction of an optical axis of the projection type display device toward a screen surface; and control means for controlling the display position of an OSD image displayed in a screen on the basis of the angle of inclination detected by the detection means.

An example of the control means is one for determining the display position of the OSD image such that the OSD image is displayed in a position, where a compression rate at the time of trapezoidal distortion correction is smaller, out of upper and lower positions of the screen.

In a projection type display device having an electrical trapezoidal distortion correcting function, a second projection type display device according to the present invention is characterized by comprising a detection circuit for detecting an angle of inclination in the vertical direction of an optical axis of the projection type display device toward a screen surface; and a control circuit for controlling the display position of an OSD image displayed in a screen on the basis of the angle of inclination detected by the detection circuit.

An example of the control circuit is one for determining the display position of the OSD image such that the OSD image is displayed in a position, where a compression rate at the time of trapezoidal distortion correction is smaller, out of upper and lower positions of the screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates an example of the installation of a liquid crystal projector in a case where the liquid crystal projector is arranged with the top thereof directed upward toward a screen;

FIGS. 2a and 2b are schematic views showing a video projected onto a screen in a case where a liquid crystal projector is installed as shown in FIG. 1 and a video projected onto the screen in a case where the video is subjected to trapezoidal distortion correction;

FIG. 3 illustrates an example of the installation of a liquid crystal projector in a case where the liquid crystal projector is arranged with the top thereof directed downward toward a screen;

FIGS. 4a and 4b are schematic views showing a video projected onto a screen in a case where a liquid crystal projector is installed as shown in FIG. 3 and a video projected onto the screen in a case where the video is subjected to trapezoidal distortion correction;

DESCRIPTION OF THE PREFERRED EMBODIMENTS

Figure 5A:
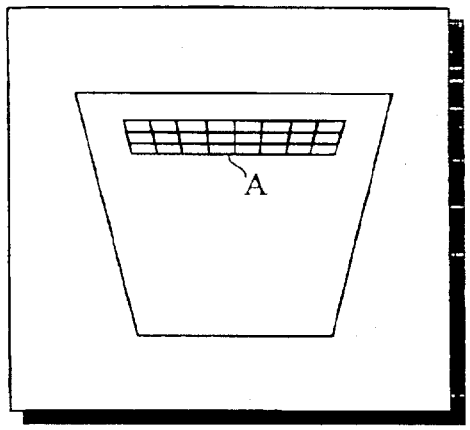
FIGS. 5a and 5b are schematic views showing a video projected onto a screen in a case where a liquid crystal projector is installed as shown in FIG. 1 and an OSD image A is included in an upper part of the video and a video projected onto the screen in a case where the video is subjected to trapezoidal distortion correction.
Figure 5B:
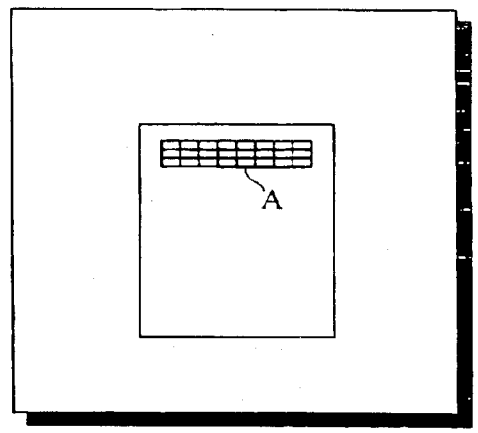
Figure 6:
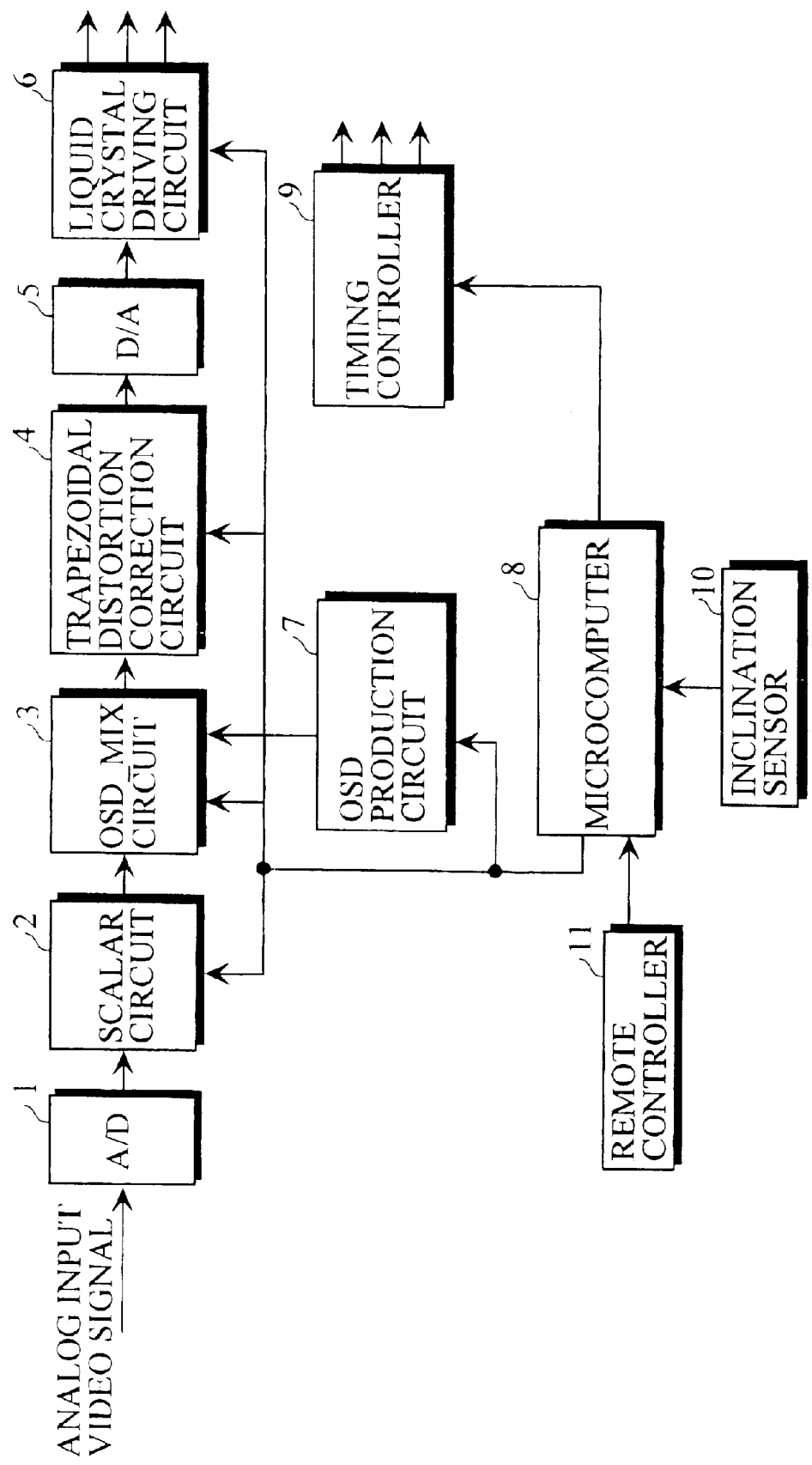
FIG. 6 is a block diagram showing the electrical configuration of a liquid crystal projector.
Figure 7A:
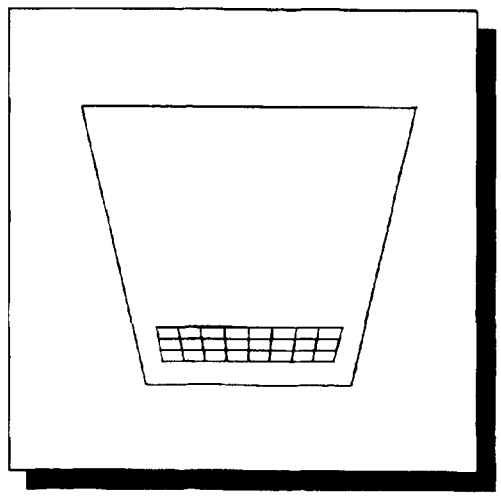
FIGS. 7a and 7b are schematic views showing that the display position of an OSD image is controlled such that the OSD image is positioned in a lower part of a video in a case where a liquid crystal projector is installed with the top thereof directed upward as shown in FIG. 1.
Figure 7B:
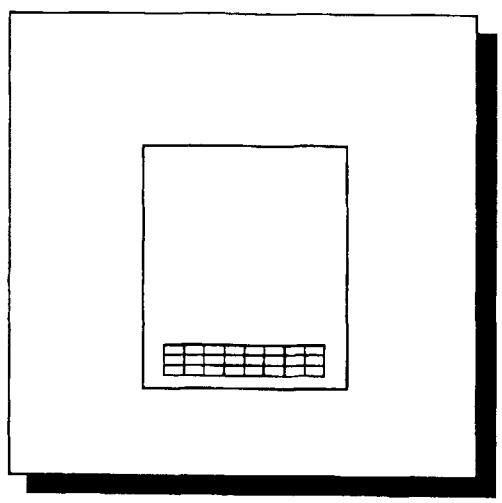

Referring now to FIGS. 6 to 8, an embodiment of the present invention will be described.

FIG. 6 illustrates the electrical configuration of a liquid crystal projector.

An analog input video signal is converted into a digital signal by an analog-to-digital (A/D) converter 1, and the digital signal is inputted to a scalar circuit 2. The scalar circuit 2 converts the resolution of the inputted digital signal and scales (enlarges and compresses) the signal in the horizontal and vertical directions depending on the resolution of a liquid crystal panel.

Video data outputted from the scalar circuit 2 is inputted to an OSD_MIX circuit 3. The OSD_MIX circuit 3 superimposes an OSD (On Screen Display) image produced by an OSD production circuit 7 on the video data outputted from the scalar circuit 2. The OSD production circuit 7 is controlled by a microcomputer 8. An output of the OSD_MIX circuit 3 is inputted to a trapezoidal distortion correction circuit 4.

The trapezoidal distortion correction circuit 4 subjects the inputted video data to trapezoidal distortion correction. The microcomputer 8 determines a parameter required for trapezoidal distortion correction (e.g., an amount of correction (a compression rate) and a position for correction) depending on an angle of inclination of the liquid crystal projector which is detected by an inclination sensor 10 (an angle of inclination in the vertical direction of an optical axis of the liquid crystal projector toward a screen surface), and feeds the parameter to the trapezoidal distortion correction circuit 4. The trapezoidal distortion correction circuit 4 makes trapezoidal distortion correction on the basis of the parameter fed from the microcomputer 8.

A signal which has been subjected to the trapezoidal distortion correction by the trapezoidal distortion correction circuit 4 is returned to an analog signal by a digital-to-analog (D/A) converter 5. An output of the D/A converter 5 is fed to a liquid crystal driving circuit 6, and is converted into a signal for driving the liquid crystal panel (not shown).

A timing controller 9 produces a timing signal required for the liquid crystal panel by data from the microcomputer 8, and outputs the timing signal to the liquid crystal panel. A remote control signal from a remote controller 11 is also inputted to the microcomputer 8.

The microcomputer 8 determines the parameter required for the trapezoidal distortion correction depending on the angle of inclination of the liquid crystal projector which is detected by the inclination sensor 10, and feeds the parameter to the trapezoidal distortion correction circuit 4. In the present embodiment, the microcomputer 8 further controls the display position of an OSD image such that the OSD image is displayed in one, in which a compression rate at the time of trapezoidal distortion correction is lower, of an upper part and a lower part of the screen on the basis of the angle of inclination of the liquid crystal projector which is detected by the inclination sensor 10 (or the parameter required for the trapezoidal distortion which is determined from the angle of inclination).

Assuming that no trapezoidal distortion correction is made in a case where the liquid crystal projector is installed with the top thereof directed upward, as shown in FIG. 1, a video projected onto the screen is a trapezoid whose lower part shrinks, as shown in FIG. 2a. When the trapezoidal distortion correction is made, the video is as shown in FIG. 2b. In such a case, the degree to which the upper part of the video is compressed is made higher by the trapezoidal distortion correction.

Figure 8A:
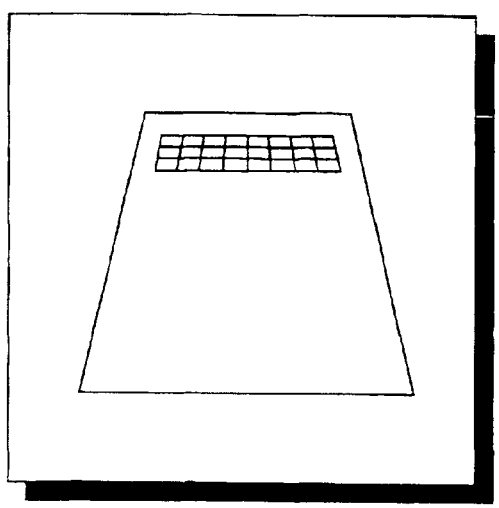
FIGS. 8a and 8b are schematic views showing that the display position of an OSD image is controlled such that the OSD image is positioned in an upper part of a video in a case where a liquid crystal projector is installed with the top thereof directed downward, as shown in FIG. 3.
Figure 8B:
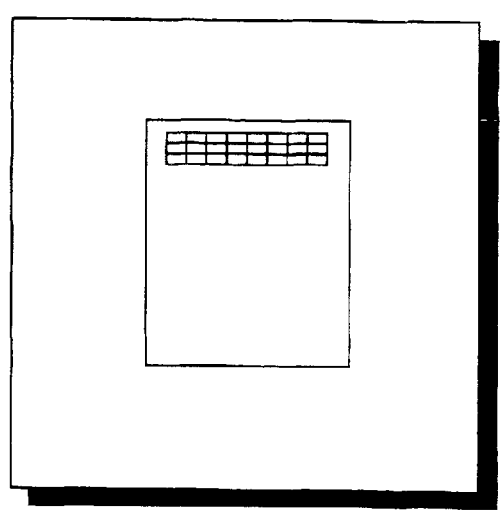

When the liquid crystal projector is installed with the top thereof directed downward, as shown in FIG. 3, the microcomputer 8 controls the display position of the OSD image such that the OSD image is positioned in the upper part of the video, as shown in FIG. 8a. That is, the microcomputer 8 instructs the OSD production circuit 7 that the display position of the OSD image is positioned in the upper part of the screen. Consequently, the image which has been subjected to the trapezoidal distortion correction is as shown in FIG. 8b, thereby making it possible to restrain the decrease in the amount of information related to the OSD image.

When the liquid crystal projector is installed with the top thereof directed downward, as shown in FIG. 2, the microcomputer 8 controls the display position of the OSD image such that the OSD image is positioned in the upper part of the video, as shown in FIG. 8a. That is, the microcomputer 8 instructs the OSD production circuit 7 that the display position of the OSD image is positioned in the upper part of the screen. Consequently, the image which has been subjected to the trapezoidal distortion correction is as shown in FIG. 8b, thereby making it possible to restrain the decrease in the amount of information related to the OSD image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a projection type display device having an electrical trapezoidal distortion correcting function, the projection type display device comprising:

detection means for detecting an angle of inclination in the vertical direction of an optical axis of the projection type display device toward a screen surface; and control means for controlling the display position of an on screen display image displayed in a screen on the basis of the angle of inclination detected by the detection means, wherein the control means determines the display position of the on screen display image such that the on screen display image is displayed in a position, where a compression rate at the time of trapezoidal distortion correction is smaller, out of upper and lower positions of the screen.

2. In a projection type display device having an electrical trapezoidal distortion correcting function, the projection type display device comprising:

a detection circuit for detecting an angle of inclination in the vertical direction of an optical axis of the projection type display device toward a screen surface; and a control circuit for controlling the display position of an on screen display image displayed in a screen on the basis of the angle of inclination detected by the detection circuit, wherein the control circuit determines the display position of the on screen display image such that the on screen display image is displayed in a position, where a compression rate at the time of trapezoidal distortion correction is smaller, out of upper and lower positions of the screen.

* * * * *